Sept. 22, 1959 C. G. MAKRIDES 2,905,309
MAIL HANDLING APPARATUS
Filed Nov. 14, 1957 5 Sheets-Sheet 1
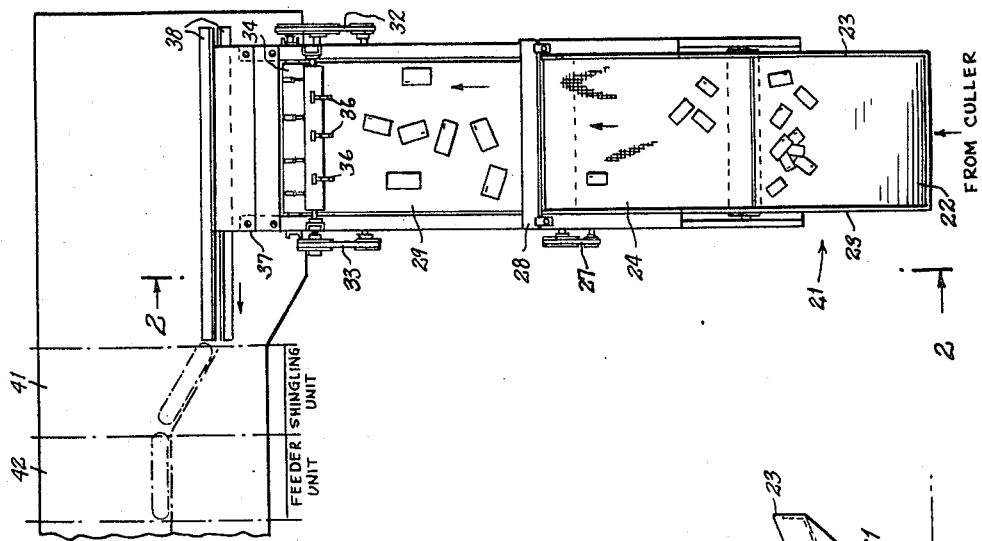
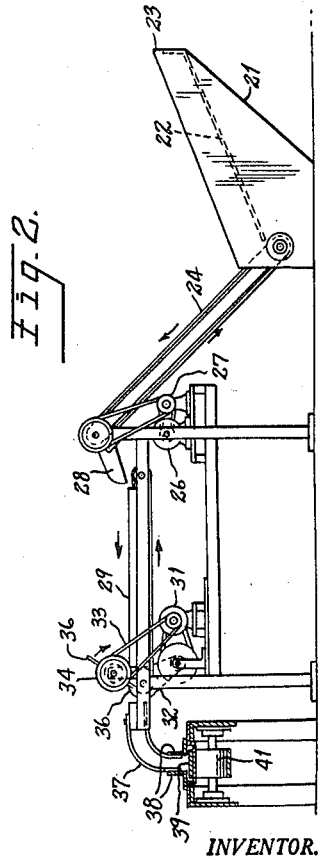
INVENTOR.
GEORGE MAKRIDES
BY
Darby & Darby
ATTORNEYS

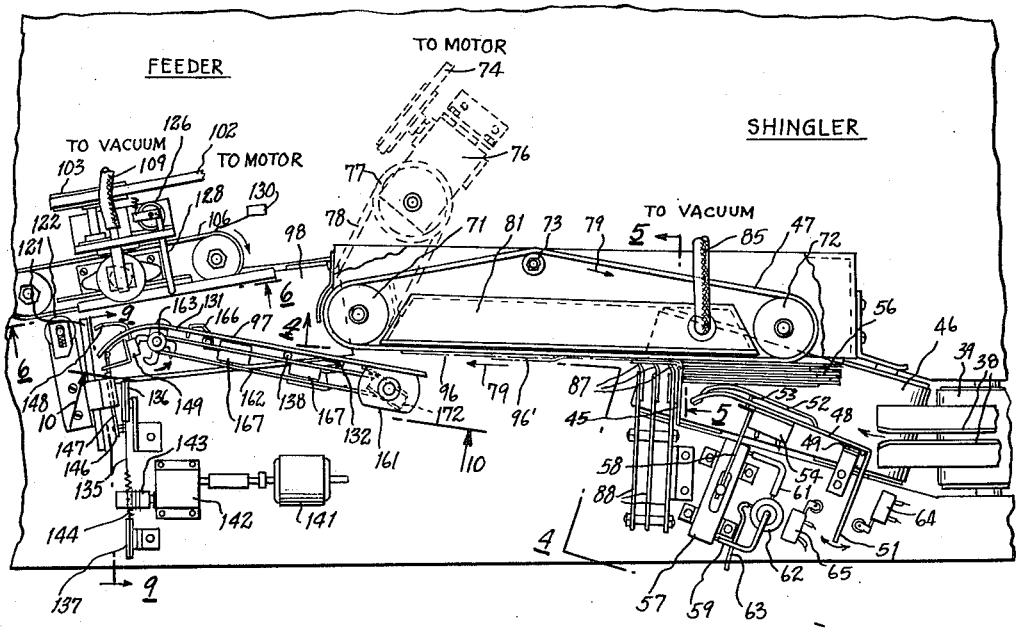
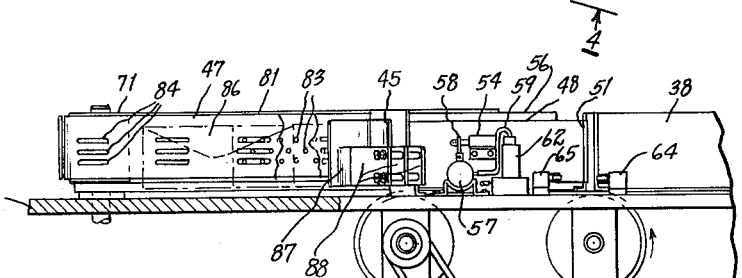
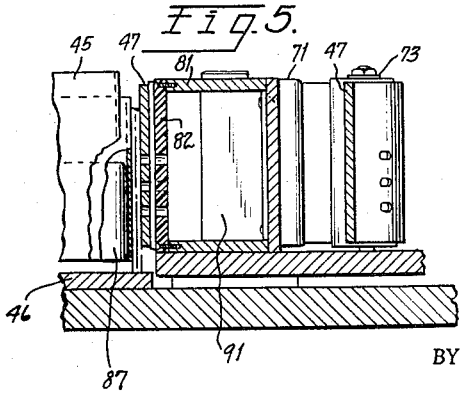

INVENTOR
GEORGE MAKRIDES
BY Darby & Darby
ATTORNEYS

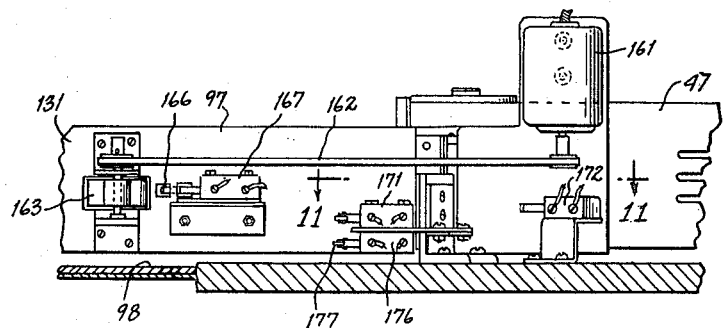
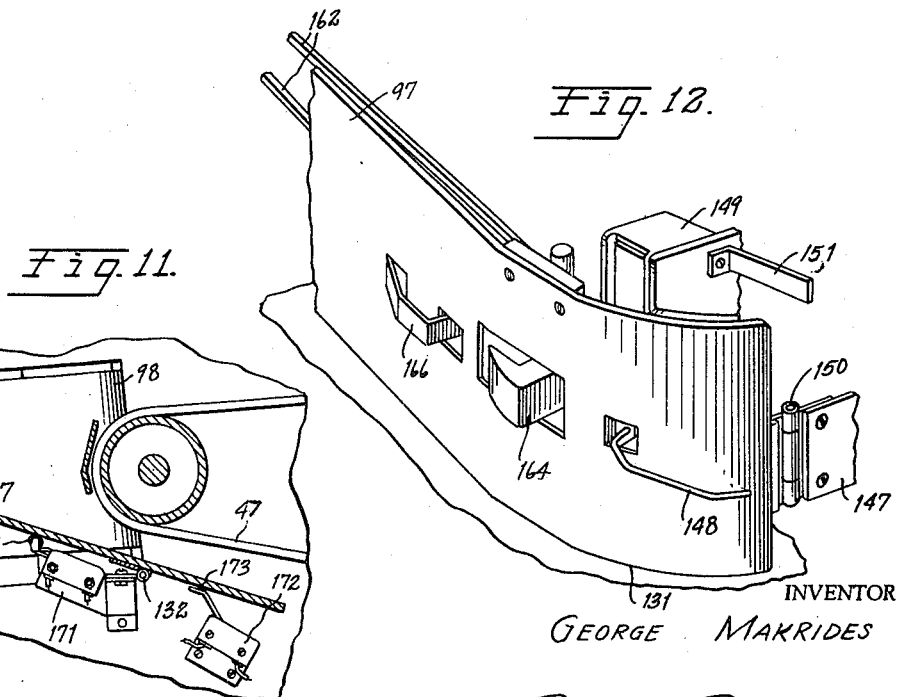

Sept. 22, 1959  C. G. MAKRIDES  2,905,309
MAIL HANDLING APPARATUS
Filed Nov. 14, 1957  5 Sheets-Sheet 5

INVENTOR.
GEORGE MAKRIDES
BY Darby & Darby
ATTORNEYS

United States Patent Office 2,905,309
Patented Sept. 22, 1959

2,905,309

MAIL HANDLING APPARATUS

Constantine George Makrides, Washington, D.C., assignor to Emerson Radio & Phonograph Corporation, Jersey City, N.J., a corporation of New York Application November 14, 1957, Serial No. 696,393

6 Claims. (Cl. 198—31)

The present invention relates to apparatus and systems for handling, transporting and regularly feeding flat light articles, and especially letter mail.

The expeditious handling and processing of letter mail has become vital to the efficient conduct of business and to communication. The volume of mail pieces has become so large as to encumber and literally swamp postal facilities at the larger metropolitan post offices handling millions of pieces of mail daily. The problems of conveying, cancelling and sorting this vast volume of varied shapes and sizes of mail pieces have heretofore not been efficiently solved, resulting in delays in mail delivery and uneconomical utilizations of space, equipment and manpower.

In solving these problems of mail handling, it is first necessary to provide apparatus adapted to accept bulk mail, in random amounts and orientations, and to convert this bulk mail into a rapid flow of single pieces of controlled velocity and spacing for subsequent operations. As a convenient way to accomplish this purpose, the bulk mail may first be formed into an irregular stream, and then this stream may have its several pieces controlled as to speed and spacing.

The present invention is particularly concerned with apparatus adapted to receive an irregular flow of flat light articles, of the nature of letter mail, such as is provided by copending patent application Ser. No. 683,284 for Mail Handling Apparatus, filed September 11, 1957, in the name of Milton A. Stovall and assigned to the same assignee as the present application. In this prior Stovall application, apparatus is described and claimed for accepting random bulk mail and, by processes of batch separation and piece separation, converting that bulk mail into a stream of required average rate of flow, but irregular in the spacing and overlapping of the individual pieces, the pieces being generally oriented in a vertical plane with their lengths extending horizontally. By one aspect of the present invention, the individual pieces are handled in a positive manner to provide an output stream of single pieces each spaced from the preceding and following ones, and travelling at a high rate of speed of the order of 150 inches per second, with a rate of flow of the order of 30,000 pieces per hour. Means are also provided for positively assuring that each piece maintains its speed and spacing during any required individual processing, such as cancelling, sorting or the like.

This is performed according to one important aspect of the invention by providing a vacuum belt transport apparatus which positively holds each letter or flat article against a rapidly moving belt whereby the individual letters or articles are precisely controlled as to speed and spacing while travelling at high speeds.

According to another feature of the invention, the input irregular flow of pieces is converted into a regular output flow by the provision of one or more accumulator arrangements, which accept an irregular or fluctuating input flow while maintaining a regular output flow. In a preferred form, this is accomplished in two stages, first by a shingler stage in which the output flow is a shingled or partially overlapped stream, supplied to a feeder stage where the pieces are finally separated individually and passed on individually. By "shingling" is meant that the mail pieces are successively partially overlapped, and are supplied in this fashion to the subsequent unit.

According to another feature of the invention, apparatus is provided for feeding single mail pieces from a stack at uniform and positively controlled high speeds, with fixed spacings of pieces. In a preferred form this is accomplished by an adaptation of the vacuum transport principle.

Still another feature of the present invention resides in apparatus for preventing undesired accidental overlapping or "doubles" among the mail pieces. Again in the preferred form, a modified vacuum belt letter transport is utilized.

Yet another feature of the present invention is the provision of improved apparatus for performing a rough separation or stretching out of mail pieces from bulk mail, in converting from bulk mail to a stream flow of mail.

The present invention is also concerned with providing apparatus for the positive transport of letter mail pieces or similar light flat articles. Such transport may be for the surpose merely of assuring positive control over the speed of the individual pieces, or may be for the purpose of providing a particular kind of flow of the mail pieces, such as a uniform shingled flow or a uniform flow of separated pieces with a minimum of space therebetween.

Other features, objects and advantages of the present invention will become more readily apparent from consideration of the following description taken in conjunction with the appended drawings in which:

Fig. 1 is a plan view of the system of the present invention;

Fig. 2 is a side elevation view of the input section;

Fig. 3 is a plan view of a shingler unit and a feeder unit according to one aspect of the present invention;

Fig. 4 is a front elevation view of the shingler unit of Fig. 3, viewed along line 4—4 thereof;

Fig. 5 is a cross-sectional elevation view of a portion of the shingler unit, taken along line 5—5 of Fig. 3;

Fig. 10 is another fragmentary elevation view of a portion of the feeder unit of Figs. 3 and 6, viewed along line 10—10 of Fig. 3;

Fig. 11 is a fragmentary cross-sectional plan view of a portion of Fig. 10 taken along line 11—11 thereof;

Fig. 12 is a fragmentary perspective view of a portion of the feeder unit of Figs. 3 and 6;

Figure 6:
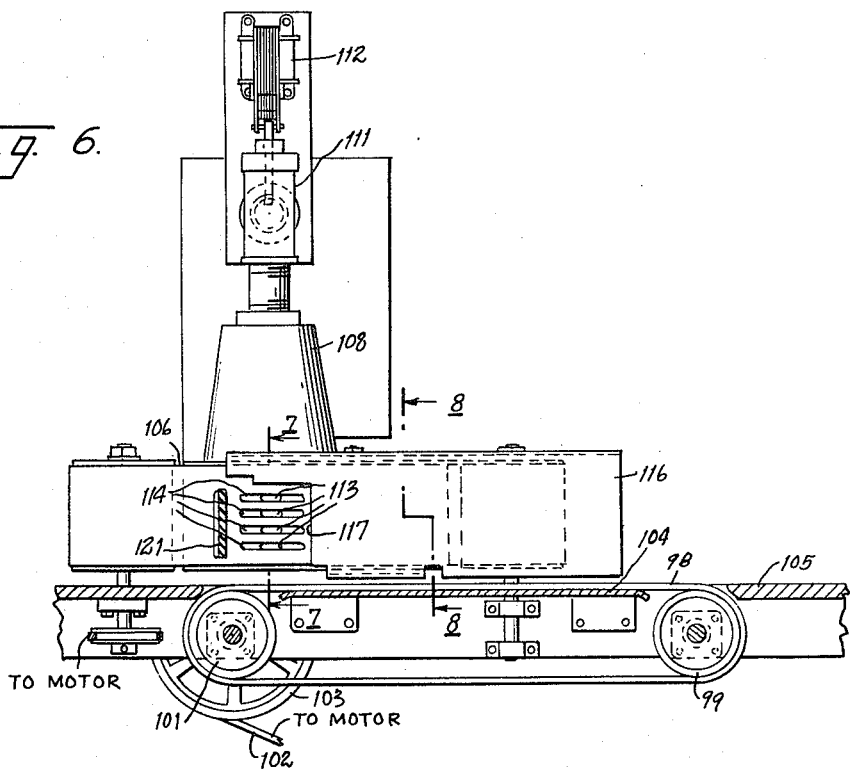
Fig. 6 is a front elevation view of the feeder unit of Fig. 3, viewed along line 6—6 thereof.

While in the following description, the various aspects of the invention are described and illustrated particularly with reference to handling of letter mail, the present invention in many aspects is equally applicable to the handling of relatively light and flat articles of any kind, and wherever reference is made to letters or mail pieces, it is to be understood that any type of light flat article is intended.

Referring to the drawings, Figs. 1 and 2 illustrate an input section for the present apparatus. Bulk mail is supplied in any suitable or convenient manner to a hopper 21 having a smooth slanting surface 23 down which the mail slides to conveyor belt 24 which is steeply inclined and has a high friction surface to transport bottom letters of the pile in contact with the belt 24, while upper letters tend to shear back due to their lesser friction. In this way a rough separation or stretching out of the mail is accomplished.

The output of conveyor 24 is fed to a horizontal conveyor belt 29 by way of a weighing tray, which operates to stop belt 24 if too large a batch of mail falls on tray 20, until it is cleared by belt 29. The details of this arrangement may be as described in the above-mentioned co-pending Stovall application.

The mail on belt 29 is conveyed to a single-piece extracting device in the form of a drum 34 having flail fingers 36 which wipe off or eject single letters from belt 29 into a chute 37 by which they are turned from a horizontal plane to a vertical plane, falling onto a horizontal conveyor 39 beneath two vertical guides 38 between which the mail pieces are conveyed on edge. The further details and controls of this apparatus may be as described in said Stovall application.

As shown there, the output of this input section comprises a stream of mail of the required average rate of flow, but irregular in volume, with considerable overlapping and doubling of mail pieces.

According to the present invention, the irregular stream may be accumulated in a stack from which a regular stream may be simultaneously taken; this may be performed in several stages, particularly if sufficient accumulation capacity is not readily available. This is described with reference to the shingler unit 41 and feeder unit 42 of Figs. 3 to 12.

Figs. 3 to 5 show a preferred form for the shingler device. The incoming uneven stream of oriented mail pieces, is transported by horizontal conveyor belt 39 in vertical position between guides 38 and is ejected from guides 38 upon the further horizontal conveyor belt 46 whose longitudinal axis is at an angle of the order of 15 to 30 degrees with respect to that of conveyor belt 39, so as to give a transverse movement to the mail pieces, which are carried by belt 46 up against a fixed dressing plate 45 against which the mail pieces are stacked as at 56 with their edges dressed.

For stacking the mail pieces for subsequent shingling, a guide plate 48 is provided, pivoted at 49 and having a rigid angular extension 51. Plate 48 carries a resilient wire or strip bow 52 which engages the mail stack 56, and presses on a rod 53 passing freely through plate 48 and operating a micro switch 54 carried by plate 48. Plate 48 is normally urged toward the mail stack 56 by a pneumatic servo motor 57 having a translatory output rod 58 connected to plate 48. Motor 57 may be a simple pneumatic cylinder having a piston connected to rod 58, with a tube 59 communicating with the cylinder on one side of the piston, and with a further tube 61 communicating with the cylinder on the other side of the piston. The tubes 59 and 61 are connected to a solenoid controlled reversing valve 62 having a vacuum or air pressure input tube 63 connected to any suitable vacuum or air pressure source. Valve 62 may be of any conventional design, normally connecting input 63 to tube 59 and connecting tube 61 to the atmosphere. Upon energization of valve 62 by a suitable electrical signal it operates to connect the input tube 63 to the tube 61 in place of the normal connection to the tube 59, and at the same time connects the tube 59 to atmospheric pressure. As a result, upon excitation of solenoid control valve 62, the differential pressure applied to the piston of motor 57 is reversed, and the rod 58, which is normally urged toward the mail stack 56, is then retracted from the mail stack. This action permits new mail pieces entering from the guides 38 by way of the conveyor belt 39 to be added to the lower end of stack 56 as viewed in Fig. 10. The solenoid valve 62 is connected to a power source by means of the switch 54, which is normally open-circuited, but is closed by bow 52 upon application of pressure from rod 58 on plate 48 against the resistance of mail stack 56. In this way, as motor 57 urges rod 58 upward as seen in Fig. 3, plate 48 and its resilient bow 52 press against the stack 56. This action causes the rod 53 passing freely through plate 48 to operate the micro-switch 54, which thereby energizes the solenoid valve 62 to reverse the pneumatic pressure applied to motor 57. This action reverses the force on rod 58 which then retracts pulling the plate 48 with it away from stack 56 to permit new letters to be added to the stack. As soon as rod 58 withdraws plate 48 from the stack 56, the pressure is relieved on the micro-switch 54, which then opens and restores the pneumatic pressure differential to the motor 57 to its original polarity. This in turn reverses the direction of rod 58 and the cycle is repeated, with rod 58 vibrating back and forth. This vibrating action keeps the stack 56 alternately compressed and loose, permitting additions to the stack from the lower end while loose, and at the same time urging the stack 56 upward so that its topmost piece can be fed on.

As indicated above, the mail pieces fed in have been but roughly separated and occur with random overlaps and spacings. However, all letters have been oriented properly with their long axes horizontal and their planes vertical. The method of transport indicated by conveyor 39 and guides 38, which may constitute the output of the Stovall application apparatus is not sufficiently precise or controllable to permit handling of the large volume and rate of mail pieces which is contemplated in the present system. Accordingly, in accordance with a further preferred aspect of the present system an improved form of letter transport is utilized which is herein termed a "vacuum belt" and is shown in one form in Figs. 3 to 5 as part of the shingler unit 41.

The vacuum belt apparatus is formed by a belt 47 which passes around friction or sprocketed drive roller 71, idler roller 72 and a tensioning idler roller 73, all of which have vertical axes, so that the belt 47 has a vertical surface. Drive roller 71 is driven at constant speed in any desired manner, as by a main drive belt 74 coming from a suitable motor or other motive power which operates through reduction gearing 76 to drive a pulley 77 coupled to the drive roller 71 as by a belt or sprocket chain 78. In this way, the belt 47 is continuously rotated in the sense shown by the arrow 79.

In cooperation with the belt 47 there is provided a vacuum manifold 81 coupled by a suitable pipe or tube 85 to a source of vacuum, such as a vacuum pump. The manifold 81 has a flat face 82 whose outer surface is formed of a very low friction material on which the belt 47 will readily slide with a minimum of friction or drag. The mainfold 81 is provided on its face 82 with a plurality of rows of apertures of which three rows are illustratively indicated at 83 in Fig. 4. Air is continuously drawn in through the holes 83 by the vacuum pressure supplied over tube 85 and thereby tends to retain the belt 47 in sliding contact with the face 82 of the manifold. The belt tension also serves this purpose. Holes 83 are preferably regularly spaced along the length of the manifold face 82, although this is not essential to the invention. Suitable baffling indicated at 91 may be supplied in the manifold 81 so as to assure that the vacuum pressure from the tube 82 is uniformly applied over all the holes 83 in the manifold face 82 juxtaposed to the belt 47, and not merely adjacent inlet tube 85.

The belt 47 is provided with a series of slots indicated at 84 in Fig. 4. Each horizontal row of slots 84 is in registry with a corresponding row of manifold holes 83.

Each of the slots 84 has a length which is at least long enough to overlap two adjoining holes 83 in the same row, so that each slot 84 will always communicate with at least one and sometimes two or even more of the holes 83.

It will be apparent that the "opaque" portions of the belt between these sets of slots 84, as at 86 in Fig. 4 will offer no attraction to any of the letters of the stack 56 as the belt passes thereby. However, where a set of slots 84 is in register with the holes 83, vacuum pressure applied to the manifold 81 is operative to suck the uppermost letter from the stack 56 up against the belt 47, where it is held as the belt 47 proceeds in its traverse between the drums 71 and 72. The angular relationship of belt 46 to the vertical vacuum belt 47 assures that the trailing end of each letter is carried up against vacuum belt 47 as needed. As the top letter 96 of the stack 56 is drawn to the left as viewed in Fig. 3, due to rotation of belt 47, the sets of slots 84 behind those which are holding the top letter 96 to the belt 47, will come into registry with corresponding openings 83 of the manifold 81 and at once pick up the second letter 96' of the stack, and this process continues with successive single letters of the stack. The sets of slots 84 are spaced along the length of the belt 47 at desired intervals. For purposes of the shingler unit 41 it is desired that the successive letters overlap in part, with no more than a single letter overlapping any other letter, and this is assured by the choice of spacing of the sets of slots 84 around the periphery of the belt 47. Preferably this spacing is so chosen that two sets of slots will occur in one maximum letter length.

In the case of most letters, the vacuum pressure of the manifold 81 operating through the belt 47 will be effective to pick up but a single letter. However, in the case of certain very flimsy letters, it may be possible for the vacuum pressure to hold two letters together. Also two letters may be stuck together for other reasons, such as static electricity or adhesion or high friction. To avoid an undesired multiple overlap of the letters, means are provided to apply a high friction retarder to the surface of the letters on the side opposite the belt. As shown in Figs. 3 and 5, a plurality of resilient high-friction fingers 87 are secured to plates 88 mounted on the table 89 supporting the apparatus. Preferably the fingers 87 are formed of resilient material such as spring steel which may be faced or laminated with or have juxtaposed therewith a ply or flap of high friction material such as rubber or the like. The center one of the set of three is provided with greater stiffness than the others so that the first flexible finger provides a preliminary retardation for any undesired overlapping letters while the second one forms a primary and strongest retarding effect. The third one then supplements the second and is primarily for assuring that even for very thick letters any undesired overlaps will be suitably retarded or scraped back. It will be understood that the vacuum pressure holds the first letter against the belt with sufficient force so as to resist any retarding effect of the fingers 87, while any super-posed overlapped letters not held by vacuum will be retarded, provided (as is usually the case) that their frictional engagement or adhesion to the first letter is of less strength than the frictional force provided by the fingers 87. The fingers 87 may be omitted where their functioning is not needed or is not desired.

It will be understood that the stack 56 provides a form of storage means which takes up the slack and serves as an accumulator. That is, if the flow of mail pieces into the shingler is sporadic or non-uniform, the stack 56 will accumulate pieces as the instantaneous rate of flow is larger than average and will feed these accumulated pieces regularly into the shingler. If the flow rate diminishes, there will be a supply of letter mail in the stack 56 to continue feeding to the shingler even during below average rates of flow. By way of example, the flow through guides 38 may be variable between 4 to 12 pieces per second. If the means flow is 8⅓ pieces per second, a storage capacity of approximately 35 letters in the stack 56 will accommodate the extreme fluctuation of input rate provided the average is maintained over an interval of 10 seconds or less.

In order to avoid undesirable engagement between the resilient bow 52 and the vacuum belt 47 under the force exerted by pneumatic motor 57, in the event that there should be no letters present in the stack 56, and also in order to avoid jamming up the stack 56 with too many letters, respective limit switches 64 and 65 are provided which cooperate with the angular extension 51 of pivoted plate 48. As the stack 56 becomes smaller the extension 51 will move forward, and actuate the micro-switch 65 which is so located that the switch 65 is closed for the minimum desired size of stack, or even just before resilient bow 52 would make contact with the belt 47. This switch 65 may be used for a variety of control purposes. For example, it may interrupt the circuit of the solenoid valve 62 so as to retain pneumatic motor 57 in its retracted position until the feeding of further mail pieces into the stack 56 causes switch 54 to take over control of the pneumatic motor 57 to continue the operation previously described. The micro-switch 65 may additionally or alternatively interrupt the vacuum applied to tube 85 and thereby to the manifold 81 in any desired manner, as by a solenoid-operated valve of conventional type in series with inlet tube 85.

In the event that the stack grows too large, extension 51 will open micro-switch 64 which is placed in the circuit of the drive for the conveyor 39 and preceding apparatus so as to halt the flow of further pieces into the stack 56 until the pieces in the stack have been fed out as described above, and stack 56 is reduced to a value permitting switch 64 to close, whereupon more mail pieces are fed to the shingling unit by restarting the preceding unit. Belt 46 is preferably continued in operation, as its slight angle with reference to vacuum belt 47 helps force the stack 56 flat against belt 47, and especially keeps the rearward or trailing edge of each letter from flapping loosely.

It will be seen that in the output from the shingler of Fig. 3 each following mail piece partially overlaps the one preceding it, and in turn is partially overlapped by the piece following it. The shingler has thereby converted the input stream of mail having a widely fluctuating rate of flow into a fairly regular stream of mail in which there is a regular but single overlapping.

Figure 7:
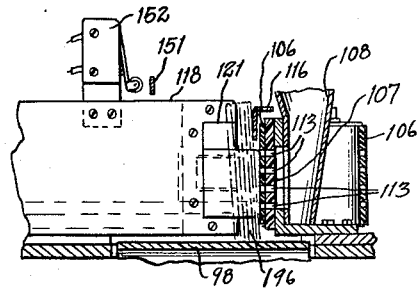
Fig. 7 is a fragmentary cross-sectional elevation view of a portion of Fig. 6 taken along line 7—7 thereof.

The output of the shingler is supplied to the feeder shown in Figs. 3 and 6 through 12. As each mail piece 96 is held against belt 47 and travels with the belt 47 to the left of the end of the manifold 81 (as viewed in Fig. 3) the slots 84 of the belt 47 holding the mail pieces move away from the last of the holes 83 of the manifold, thereby releasing the suction which held the piece to the vacuum belt 47. Because of its velocity and inertia, the mail piece is then projected forward beyond the roller 71 against a vertical guide wall 97 inclined slightly (of the order of 10 to 30 degrees) to the direction of travel of the mail pieces on belt 47. Below wall 97 is a further horizontal conveyor belt 98, which is also shown more clearly in Fig. 6 as passing over rollers 99 and 101, one or more of which is rotated from a suitable source of power means, such as a drive belt or chain 102 engaging a pulley or sprocket wheel 103 coupled to roller 101. The horizontal belt 98 slides on top of a horizontal support plate 104 having a low friction surface and is in alignment with the stationary table top 105. The horizontal conveyor belt 98 is again at a slight angle of between 10 and 30 degrees with respect to the direction of the transporting section of the vacuum belt 47, in a manner similar to conveyor belt 46 and thereby serves to move both the leading edge and trailing edge of each mail piece up against the dressing plate 118 and the feeder vacuum belt 106, which is also at a slight angle of the order of 10 degrees with respect to the longitudinal axis of horizontal conveyor belt 98. The mail pieces carried by horizontal belt 98 have their leading edges dressed against dressing plate 118 against which the mail pieces form a stack 196 as shown in Figure 7.

Vacuum belt 106 cooperates with a manifold 107 supplied with vacuum pressure through a flaring channel 108 connected to a vacuum source as by a tube 109 (Fig. 3). A valve 111 (Fig. 6) actuated by a solenoid 112 is adapted to cut off the supply of vacuum from manifold 108 whenever solenoid 112 is energized. In view of its feeding function, manifold 107 has a different arrangement of holes or ports than in the manifold 81 of the shingler unit 14. As seen in Fig. 6, manifold 107 is provided with a single vertical row of holes 113, illustrated as four in number, although any other desired number may be used. The vacuum belt 106 in this instance is also different from that of the shingler unit 41. It has a set of slots 114 adapted to register respectively with the ports 113 of the manifold 107 for a predetermined interval of time depending upon the length of the slots 114 and the linear velocity of the vacuum belt 106.

The function of this feeder unit is to pick up one mail piece at a time and to eject the mail pieces at a uniform spacing, such as with a uniform distance between the leading edges of successive pieces. Preferably for the operations which may follow the pieces not only should be non-overlapping but should be separated by at least a minimum distance. By way of example, with letter mail of up to twelve inches in length, a minimum distance of four inches between letters is desirable to be maintained although this is not critical. The length of slots 114 is chosen in relation to the belt speed so as to have the belt positively pick up a mail piece and accelerate it to the desired uniform speed before releasing it for passage to following units.

The belt 106 may have but one set of slots 114, in which case the length of the belt 106 is so arranged that, as the set of slots 114 picks up a mail piece and ejects it to the left (as seen in Fig. 6 and in Fig. 3), and the belt rotates further, the set of slots 114 comes around to pick up the next mail piece with proper spacing maintained between successive pieces. If desired, the belt 106 may be provided with a plurality of sets of such slots 114 in which case the spacing between successive sets of slots 114 then provides the proper spacing between mail pieces. By way of example, if two or more sets of slots 114 are used they may be spaced sixteen inches apart, thereby assuring a minimum of four inches separation between each successive pair of pieces.

A shield 116 maintains the letters away from the vacuum belt 106 except in one region formed by a cut-out 117 in shield 116, this cut-out being generally in registry with the manifold ports 113, which are spaced from dressing plate 118 by a distance somewhat less than the minimum letter length. Thus the mail pieces in stack 196, with their left edges lined up against plate 118, are urged against shield 116 which, shield 116 generally maintains the stack 196 separated from the vacuum belt 106 by a small distance such as of the order of 1/32 to 1/8 of an inch. For most of each period of rotation of the vacuum belt 106 the ports 113 of the manifold 107 are covered by the opaque portions of belt 106 and no attractive force is exerted on the pieces. However, as the slots 114 of the belt 106 come into registry with the manifold ports 113, the vacuum pressure moves the closest letter of the stack into contact with the portion of the belt exposed by the cut-out 117 of shield 116, which then moves toward belt 106 to facilitate picking the letter up. This one letter is then carried by the belt 106 past a resilient retarding flap 121 which is urged against the belt 106. Flap 121 shown more clearly in Figures 6 and 7 is formed of a resilient material, preferably of a high friction material, such as rubber or the like, to apply a high friction retarding action to the surface of the letter on the side opposite belt 106 for preventing any undesired overlapping of letters carried by belt 106. A suitable spring-biased member 122 has sufficient movement or play to permit passage of the thickest tolerated letter (i.e. one-quarter inch thick in the example given above).

Figure 8:
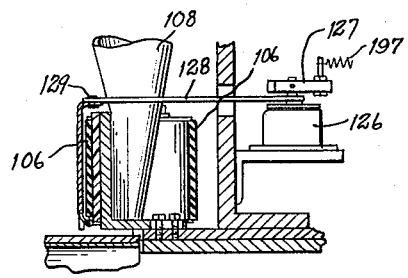
Fig.8 is a fragmentary cross-sectional elevation view of another portion of Fig. 6 taken along line 8—8 thereof.
Figure 9:
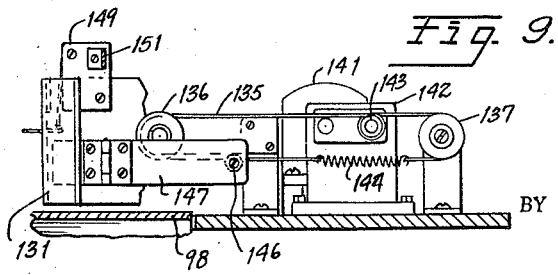
Fig. 9 is a fragmentary elevation view of another portion of Fig. 6, viewed along line 9—9 of Fig. 3.

Both to reduce friction between letters in the stack and to keep the stack of letters aligned as new letters are fed to one end of the stack and single ones extracted from the other, the shield 116 is caused to vibrate in step with the pick-up of individual letters. This is done by means of a rotary solenoid 126 (Fig. 8) whose armature upon excitation rotates a crank arm 127 which pushes a rod 128 pivotally coupled at 129 to the shield 116. The rotary solenoid 126 has the crank arm 127 attached rigidly to its shaft so that as the solenoid shaft rotates, the crank arm which is attached rigidly to the solenoid shaft also rotates, thereby driving rod 128 and hence causing shield 116 to vibrate. A spring 197 causes return of the shield 116 to the right as seen in Fig. 8. The solenoid 126 is excited by means of a suitable micro-switch 130 having its arm actuated by a slot 114 on vacuum belt 106 so that, taking into consideration the delays in movement of the armature of solenoid 126 following energization of the solenoid 126, just as the slots 114 enter the cut-out 117 the shield 116 will move away from the stack toward the belt 106 by a slight amount, of the order of 1/16 of an inch, to loosen the stack and make it easier for the vacuum belt to pick up one letter at a time. Due to the rapidity of operation of this device, the shield 116 provides a sort of beating action on the stack which assists in maintaining the stack dressed with the leading edges along the wall 121 and loosens it up to facilitate extracting the single letter at the top.

To maintain the stack dressed along the wall 118 and also in position for its top letter to be picked up by the belt 106, guide plate 97 has curved guide portion 131 and is pivoted at 132. Means are provided for urging the curved guide portion 131 against the stack 96 of letters. Thus, as seen most clearly in Figs. 3 and 9, a small electric motor 141 is coupled by reduction gearing 142 to a drive drum 143 which drives a cable 135 passing over two pulleys 136 and 137. A take up spring 144 maintains the cable 135 taut. Suitably secured to the cable 134 at 146 is a rigid arm 147 whose other end is pivotally coupled to the curved guide 131 at 150 (Fig. 12). Motor 141 normally rotates to drive cable 135 to have arm 147 push guide 131 against the stack 96 of letters. A resilient feeler 148 (shown as a wire bow) is mounted on the curved guide 131 and when pressed by guide 131 against stack 96 actuates a micro-switch 149 also supported on guide 141, which reverses the rotation of motor 141 to drive the guide 131 away from the stack 96. As guide 131 moves away from the vacuum belt 106, it relieves the force on feeder 148 to actuate a micro-switch 149 oppositely, which then operates to reverse motor 141 to return the guide 131 toward the stack of mail. In this way, the guide 131 vibrates toward and away from the stack 196 thereby permitting fresh letters to be added to the stack with their leading edges dressed against plate 118. Guide 131 carries a lug 151 which engages a further microswitch 152 should the stack grow too large, and cuts off cable motor 141.

A further small motor 161 (Fig. 10) supported on plate 97 drives a belt or cable 162 which rotates a wheel 163 having a plurality of marked arms 164 which project slightly beyond the wall of guide 131 (see Fig. 12) and thereby engage oncoming letters to slow them down and permit them to pass only one at a time and with fairly regular spacing to help form them into a dressed stack. A feeler 166 on plate 97 operating a micro-switch 167 operates to turn off motor 161 in the absence of sufficient mail in the stack.

The guide plate 97 is pivotally mounted about its vertical axis 132 (Fig. 11) and is provided with a pair of limit switches 171 and 172 mounted on the table. The arm 175 of switch 171 is actuated whenever the plate 97 is pivoted about axis 132 by a maximum stack of mail, to stop the shingler unit belt supplying the feeder unit to allow the feeder unit to catch up by passing on its stack. When the stack is again diminished to the desired level the switch 171 is closed to restart the shingler unit belt. Similarly the arm 173 of switch 172 is actuated by the rear end of plate 97 whenever a minimum stack of mail exists at the entrance to the feeder unit. Switch 172 then operates to stop belt 106 so that the feeder unit is inoperative until more letters are supplied to it. A switch 176 shown in Fig. 10 is mounted below switch 171 and its arm 177 is released by plate 97 whenever the stack is minimum to actuate solenoid 112 to cut off vacuum from the feeder unit until the stack grows larger than a predetermined minimum.

The vacuum belt arrangement illustrated with respect to the shingler unit of Figs. 3 to 5 and the feeder unit of Figs. 3 and 6 to 12 is of general application wherever it is desired to transport thin, flat light articles, and the concept of such a vacuum belt in its various ramifications forms an important part of the present invention.

It will be noted, as best seen in Fig. 4, that in the shingler unit the manifold is provided with a series of horizontal rows of generally circular apertures marked 83, while the belt is provided with a corresponding number of rows of horizontally extending slots, each slot being large enough to encompass at least two of the holes 83. It will also be noted that the manifold holes are staggered with respect to a vertical line. This staggering provides a useful function in assuring that at all times that the slots 84 of the belt are passing the apertured face of the manifold, there will be vacuum pressure applied against the letter being transported. Thus considering the elongated horizontal slots 84, as the belt to which the letter is held by vacuum pressure passes across the manifold, the opaque portion of the belt blocks off successive holes of the manifold. While this action is proceeding, the elongated slots are uncovering holes in advance of the one holding the letter, so that before a manifold hole which is holding the letter is blocked off, another hole in advance of it takes over the holding function, and at all times in each row of holes there is at least one in direct communication with the letter through a slot of the belt.

A similar situation, but with a modification, is illustrated with respect to the feeder, shown in Fig. 6. Here the manifold has only a single vertical row of holes. The belt on the other hand has a corresponding vertical arrangement of slots 114 occurring in a single set, which may be duplicated a number of times around the length of the belt depending upon the total circumference. In this instance the desired condition is that a letter being picked up from the stack shall be positively transported away from the stack. This is assured by the arrangement of manifold and belt apertures. As the set of vertically arranged slots 114 passes from the right side of the apparatus as viewed in Fig. 6, it at first has no effect because it is passing over blank or unapertured parts of the manifold. Finally, the leading or left edge of the slots 114 arrive at the location of the manifold apertures 113. When these apertures are in registry, the vacuum pressure is then exerted against the end letter of the stack, which is then attracted to the belt and remains held to the belt during the subsequent movement of the belt for a distance corresponding to the length of the slots 114. The length of the slots is preferably correlated to the shortest length letter to be accommodated; that is the slots are no longer than such shortest length letter. This arrangement therefore assures picking up only a single letter, which is then transported through the resilient wipe-back 121 to be ejected from the apparatus on the left for subsequent use.

It will be understood that where desired the vertical row of apertures 113 can be repeated a number of times to the left of the row shown in Fig. 6, so as to assure positive transport of the letter for whatever distance may be required. Here again, where positive transport is desired, the holes in the manifold should be spaced horizontally closer than the length of the slot 114.

When the vacuum belt is to be used primarily for positive transport, the manifold may be successively apertured continuously for an extended length determining the length of positive transport, and the belt is provided with a continuous row or rows of registering and overlapping apertures for its entire closed loop. Such transport arrangements may of course be cascaded, with each transferring its transported piece to the next.

It will be understood that the desired condition is the indicated relationship between manifold apertures and belt apertures indicated above. This relationship can be inverted; that is the apertures allocated to the belt can instead be made in the manifold and vice versa. This does not change the essential interrelationships between manifold and belt and will provide the same results.

Accordingly, this vacuum belt arrangement provides a positive transport for letters or similar articles, in which their speed is determined by the belt linear speed and the orientation is maintained without change.

The vacuum belt arrangement also provides a desirable means for separating "multiples," which are letters undesirably overlapped. This is illustrated with respect to Figs. 13 to 15.

Figure 13:
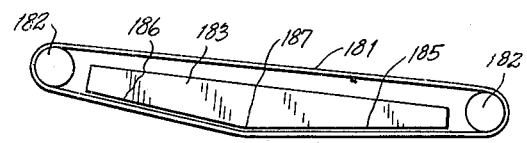
Fig. 13 is a fragmentary plan view of a modified form of vacuum belt arrangement according to another aspect of the present invention, useful particularly for doubles elimination.
Figure 14:
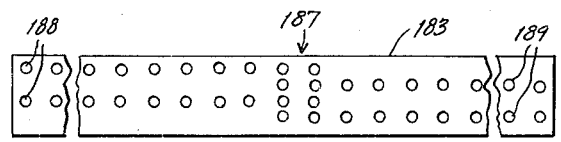
Fig. 14 is a side elevation view of the vacuum manifold of Fig. 13.

Fig. 13 shows in schematic form a vacuum belt 181 passing over rollers or drums 182, one of which may drive the belt in a clockwise direction as seen in Fig. 13. The belt passes over and is in slidable engagement with a manifold 183 which in this instance has two linear surfaces 185 and 186 joined by a smooth curve 187 which is designated as a "switch point." Fig. 14 shows in fragmentary schematic form the configuration of apertures in the manifold 181. In this instance, at the left of the switch point 187 there are two rows of apertures 188, and at the right of the switch point 187 there are two further rows of apertures 189, these two rows being vertically offset from rows 188 and partially overlapping as shown in the vicinity of the switch point 187.

Figure 15:
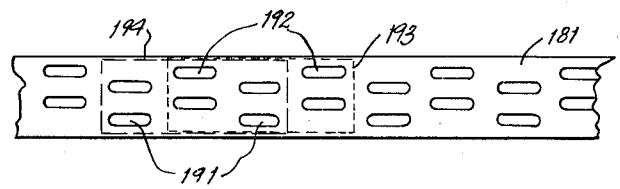
Fig. 15 is a side elevation view of the vacuum belt of Fig. 13.

Fig. 15 shows schematically the apertures in the belt 181. These are formed of successive pairs of elongated slots, alternate pairs 191 being in registry with the rows of manifold holes 189 and intermediate slots 192 being in registry with the other rows of manifold apertures 188.

It sometimes happens that in the transport of letters by means of vacuum belts such letters arrive in an overlapped condition and if both overlapped letters are in engagement with belt apertures, they will both be positively transported in their original overlapped relationship, which may be undesirable. This is illustrated in Fig. 15 where one letter or mail piece 193 shown in dotted lines may be in complete engagement with the face of the belt, while a second letter shown in dot and dash lines 194 may be in engagement only with the leftmost slots 191, and overlap the letter 193 for the remainder of its length.

By arrangement of slots 191, 192 of the belt and the apertures 188, 189 of the manifold the overlapped letter in the dashed lines may be released from the vacuum pressure without in any way affecting the properly transported dotted line letter 193. Thus, considering the overlapping rows 188, 189 at the switch point 187, it will be seen that the lefthand slots 191 will go out of registry with the rows 189 at the switch point 187, thereby releasing letter 194 completely from direct vacuum pressure, since the letter 193 blocks off letter 194 from the following belt slots. However, the letter 193 is still positively transported since its slots 192 come into registry with the holes 188 at the same time that its slots 191 go out of registry with the holes 189. This keeps constant vacuum pressure against letter 193 assuring its positive transport. However, with respect to letter 194, the curve in the manifold at the switch point 187 causes the letter 194 to be ejected straight forward, as by inertia, while the letter 193 is maintained against the belt 181 as the belt turns the corner at the switch point. If desired, suitable means in the form of rollers or a further vacuum belt can be provided adjacent the switch 187 to assure that the ejected letter 194 will be positively removed from the vicinity of the belt 181.

The vacuum belt arrangement is also highly useful in assuring positive direct transport of many types of light articles in the nature of letters. By making the rows of manifold apertures (such as rows 83 of Fig. 4, or 188 or 189 of Fig. 14) sufficiently long, the letters can be transported positively for like distances, with the assurance that there is no slippage with respect to the belt, so that the belt velocity at all times determines the letter velocity. This can be extremely important, specifically in connection with suitable processing of articles or letters on the fly, as is described in the copending application of Richard F. Blake, Stanley R. Goodman and Joseph Rudigier, Serial No. 686,529, for Mail Handling Apparatus, filed September 26, 1957, in which is described a system by which letters being transported at high speed are sensed by suitable means (i.e. photoelectric means) to determine the existence and location of stamps, and produce signals representative thereof, which thereafter determines the application of cancellation to the letters on the fly and determines the sorting to be accomplished, all at a constant and high rate of speed. By the use of vacuum belts according to the present invention, the speed of travel of the letters can be closely and accurately maintained at all times during the sensing and processing of the letters, so as to provide an accurate means of accomplishing such processing.

It will be understood that vacuum belts of the present arrangement, particularly when used solely for transport, can be cascaded. Thus a letter can be positively transported by one vacuum belt and just as that vacuum belt would normally release the letter, due to the operative belt apertures leaving registry with the last manifold ports, a subsequent belt along the path of travel can seize the same letter and continue its transport without interruption in flow or change in rate of speed.

While as illustrated herein the letters are preferably traveling horizontally on edge in a vertical plane, so that the vacuum belt has its operative face arranged vertically, this is not an essential limitation on the use of such belts. Such vacuum belts may also be utilized in which the direction of letter travel is vertical or at some angle either to the horizontal or to vertical.

Furthermore, while in the foregoing description the vacuum has been indicated as applied continuously, in some applications of the present invention, the vacuum pressure may be made to be pulsating. Particularly with respect to the feeder of Fig. 6, it may be advantageous in some uses to apply the vacuum pressure only shortly before the vertically arranged set of belt slots 114 comes into registry with the stationary manifold ports 113, leaving the vacuum turned off or blocked at other times. This can serve a useful purpose particularly in avoiding doubles or overlaps, since there will then be no force whatever on the second letter of the stack until the desired instance. Turning off the vacuum is easily accomplished by energizing solenoid 112 to open the manifold to the atmosphere. Preferably this is done whenever the feeder is to be stopped, as it halts the output almost instantaneously.

Such vacuum belts can also be used with the belt disposed horizontally, where it can then serve to separate light from heavy mail.

By the foregoing description, it will be seen that the present invention has provided a system and apparatus adapted to accept random batches and masses of letter mail or the like and which by successive processes of attrition and speeding up, coupled with temporary accumulation, converts that mail into a continuous positively controlled stream flowing at a high uniform speed with a minimum of doubling or overlapping, suitable for subsequent closely controlled operations.

It will be noted that both the shingler unit 41 and the feeder unit 42 utilize a plate following up the stack, to press it against the vacuum belt, while vibrating back and forth to permit additions to the other end of the stack. While in one instance the vibrating is done pneumatically and in the other electrically, it will be understood that both arrangements may be electrical or both pneumatic, or other suitable means may be used.

The inclined separating belt 24 has been indicated as having a high friction surface. To assure this high friction, cleats or other projections may be added to engage the lowest letters. Where desired, belt 24 may also be made a vacuum transport belt, thereby effectively increasing the friction.

It should be understood that this invention is not limited to the specific details of construction and arrangement herein illustrated, and that changes and modifications will occur to one skilled in the art without departing from the spirit of the invention which is defined solely by the appended claims.

What is claimed is:

1. Apparatus for handling light flat articles such as letter mail which may be undesirably overlapped comprising a stationary manifold, means for applying vacuum pressure to said manifold, a continuous belt sliding against the surface of said manifold, means for causing said vacuum pressure to be applied to said articles to hold them positively against said belt during movement of said belt, and means for releasing said pressure on the forward portions of said articles without release of such pressure on another portion thereof, whereby any overlapped articles held only at their forward portions will be entirely released from said belt.

2. Apparatus as in claim 1 wherein said last means comprises staggered arrays of apertures in said manifold and corresponding staggered arrays of apertures in said belt.

3. Apparatus for handling light flat articles such as letter mail comprising a stationary vacuum manifold, means for applying vacuum pressure to said manifold, a continuous belt sliding against the surface of said manifold, means for causing said vacuum pressure to be applied to said articles to hold them positively against said belt during movement of said belt, and means for holding a stack of said articles in position to be successively picked up by said belt, and means for loosening the articles in said stack just prior to pick-up of each said article to facilitate pick-up of but a single article at a time.

4. Apparatus as in claim 3, wherein said last means comprises means responsive to travel of said belt for momentarily moving said stack away from said belt.

5. Apparatus for smoothing the flow of light flat articles comprising an input conveyor means for supplying an irregular longitudinal flow of said articles on edge, a continuously moving horizontal conveyor belt at a slight angle to said flow and adapted to receive said articles thereon, a dressing plate in the path of said articles on said belt and adapted to align the leading edges thereof to form a stack of articles, a guide plate generally parallel to said dressing plate and at one end of said stack, article transport means at the other end of said stack for regularly transporting away single articles from said stack other end, and means for moving said guide plate toward and away from said stack to permit addition of further articles to said stack at said one end thereof while maintaining said stack in juxtaposition to said transport means.

6. Apparatus as in claim 5 wherein said last means comprises motive means for moving said guide plate toward said stack and means responsive to interaction between said guide plate and said stack for reversing said motive means.

References Cited in the file of this patent

UNITED STATES PATENTS

| | | |
|---|---|---|
| 1,136,960 | Ielfield | Apr. 27, 1915 |
| 2,352,983 | Trump | July 4, 1944 |
| 2,645,327 | Hildmann | July 14, 1953 |
| 2,745,537 | Cadman | May 15, 1956 |